United States Patent [19]

Iwazaki et al.

[11] Patent Number: 5,061,868
[45] Date of Patent: Oct. 29, 1991

[54] SPINDLE MOTOR

[75] Inventors: Kuniyasu Iwazaki; Kihachiro Ohta, both of Naka, Japan

[73] Assignee: Nippon Densan Corporation, Kyoto, Japan

[21] Appl. No.: 587,249

[22] Filed: Sep. 24, 1990

[30] Foreign Application Priority Data

Sep. 25, 1989 [JP] Japan .................... 1-248695
Sep. 28, 1989 [JP] Japan .................. 1-114097[U]
Sep. 28, 1989 [JP] Japan .................. 1-114098[U]

[51] Int. Cl.$^5$ .............................................. H02K 5/24
[52] U.S. Cl. .............................. 310/67 R; 310/68 R; 310/90
[58] Field of Search ............... 310/66, 67 R, 90, 90.5, 310/89, 87, 68 R, 68 B, 156; 384/100, 118, 119; 360/78.04, 78.06

[56] References Cited

U.S. PATENT DOCUMENTS

| | | | |
|---|---|---|---|
| 4,519,010 | 5/1985 | Elsaesser et al. | 360/97 |
| 4,647,803 | 3/1987 | von der Heide et al. | 310/87 |
| 4,800,309 | 1/1989 | Lakin | 310/89 |
| 4,814,652 | 3/1989 | Wright | 310/89 |
| 4,817,964 | 4/1989 | Black, Jr. | 27/1 |
| 4,818,907 | 4/1989 | Shirotori | 310/89 |

FOREIGN PATENT DOCUMENTS 63-257956 4/1987 Japan .................. 310/67 R

Primary Examiner—Steven L. Stephan
Assistant Examiner—Matthew Nguyen
Attorney, Agent, or Firm—McCormick, Paulding & Huber

[57] ABSTRACT

A spindle motor comprising a fixed shaft member, a hub member rotatably supported by the fixed shaft member through bearings, and a magnetic-fluid type sealing mechanism arranged between the fixed shaft member and the hub member. The magnetic-fluid type sealing mechanism has a rotary member mounted on the hub member, a stationary member mounted on the fixed shaft member, and a magnetic fluid holding device for holding a magnetic fluid. The magnetic fluid holding is secured to the annular mounting portion of the stationary member. The magnetic fluid holding device and the annular portion of the rotary member cooperate with each other in holding the magnetic fluid therebetween. The fixed shaft member has an axially extending locating recess or projection, while the stator and the circuit assembly have locating projections or recesses for cooperation with the locating recess or projection of the fixed shaft member so as to set the stator and the circuit assembly in a predetermined angular positional relationship to each other. The fixed shaft member is provided with a stopper projection, and an urging device for urging the stator and the circuit assembly towards the stopper projection is provided, so that the stator and the circuit assembly are held at predetermined axial positions on the fixed shaft member by cooperation between the stopper projection and the urging means.

13 Claims, 4 Drawing Sheets

SPINDLE MOTOR

BACKGROUND OF THE INVENTION

1. Field of the Invention

The present invention relates to a spindle motor for rotationally driving a recording member such as a magnetic disk.

2. Description of the Related Art

In general, a fixed=shaft type spindle motor has a fixed shaft member, a hub member rotatably carried by the fixed shaft member through a bearing, a rotor magnet fixed to the inner peripheral surface of the hub member, and a stator disposed inside the rotor magnet so as to oppose the rotor magnet. The recording member is secured to the hub member.

The spindle motor of the kind described has a sealing mechanism of labyrinth type or magnetic fluid type, in order to prevent particles such as grease in the bearing from coming into the disk chamber.

The use of a magnet fluid type sealing mechanism, however, suffers from the following problem in connection with the mounting thereof. The magnetic fluid type sealing mechanism has a magnetic fluid holding means composed of, for example, an annular permanent magnet and a pair of pole pieces disposed on both end surfaces of this permanent magnet. Conventionally, this magnetic fluid holding means is fixed to the hub member. A space formed between the pair of pole pieces of the magnetic fluid holding means and the fixed shaft member is filled with a magnetic fluid. Therefore, as the hub member rotates in a predetermined direction, the magnetic fluid tends to be displaced radially outward due to centrifugal force. As the magnetic fluid is displaced radially outward, the centrifugal force acting on the magnetic fluid is correspondingly increased so as to cause scattering of the magnetic fluid.

In this type of spindle motor, the rotational angular position of the rotor magnet is sensed by an angular position sensor such as a hall element, and the current supplied to the armature coil of the stator is controlled in accordance with the output signal from the angular position sensor. Therefore, in order to attain a precise control of rotation of the hub member, it is necessary that the angular position sensor be precisely located with respect to the stator.

Usually, in this type of spindle motor, a circuit assembly including the angular position sensor and the stator is secured to the fixed shaft member. It is also necessary that the circuit assembly and the stator are precisely located in the direction of axis of the fixed shaft.

SUMMARY OF THE INVENTION

A first object of the present invention is to provide a spindle motor which provides a remarkable effect in suppressing scattering of the magnetic fluid.

A second object of the present invention is to provide a spindle motor which enables a stator and a circuit assembly to be located at a required angular positional relationship without substantial difficulty.

A third object of the present invention is to provide a spindle motor which enables a stator and a circuit assembly to be located at predetermined positions on the fixed shaft comparatively easily and without fail.

To this end, according to one aspect of the present invention, there is provided a spindle motor comprising a fixed shaft member, a hub member rotatably supported by the fixed shaft member through bearing means, a rotor magnet mounted on the hub member, a stator disposed inside the rotor magnet so as to oppose the rotor magnet, and a magnetic-fluid type sealing mechanism arranged between the fixed shaft member and the hub member, the magnetic-fluid type sealing mechanism having a rotary member mounted on the hub member, a stationary member mounted on the fixed shaft member, and magnetic fluid holding means for holding a magnetic fluid, the rotary member having an annular portion made of a magnetic material and opposing the outer peripheral surface of the fixed shaft member, the stationary member having an annular mounting portion arranged on the radially outer end of the annular portion of the rotary member, the magnetic fluid holding means being secured to the annular mounting portion of the stationary member, the magnetic fluid holding means and the annular portion of the rotary member cooperating in holding the magnetic fluid therebetween.

The above and other objects, features and advantages of the present invention will become clear from the following description of the preferred embodiments when the same is read in conjunction with the accompanying drawings.

DESCRIPTION OF THE PREFERRED EMBODIMENTS

The invention will be described in more detail with reference to the accompanying drawings which show preferred embodiments of the present invention.

First Embodiment

Figure 2:
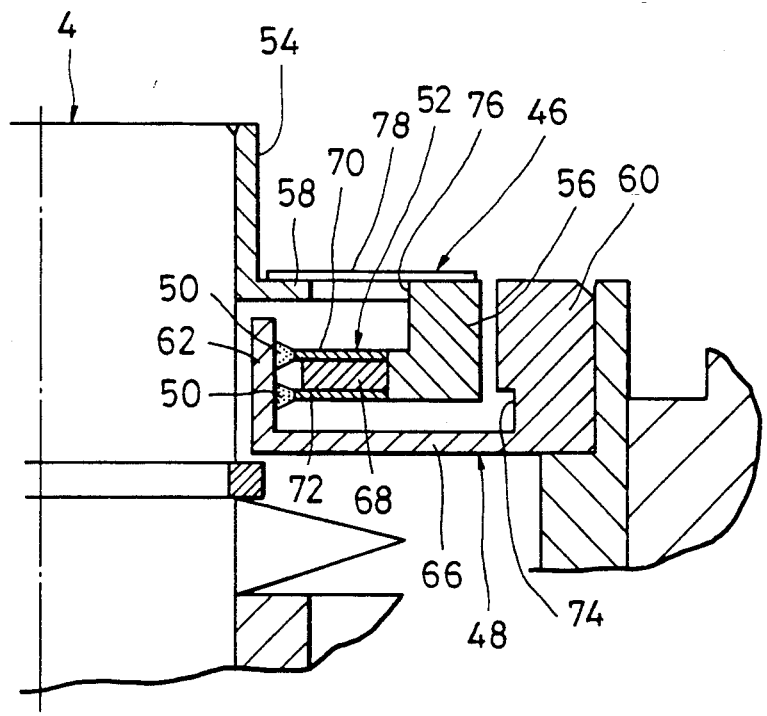
FIG. 2 is a fragmentary enlarged sectional view of a portion of the magnetic-fluid type sealing mechanism in the spindle motor shown in FIG. 1.
Figure 3:
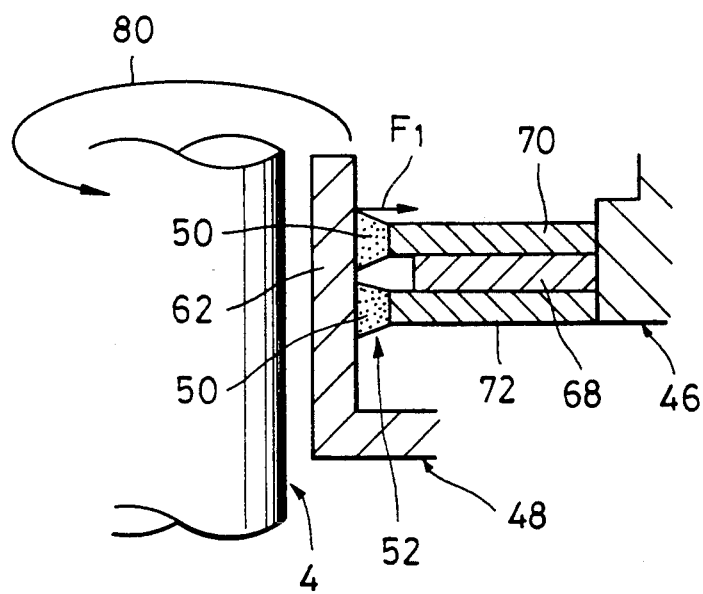
FIG. 3 is an illustration of centrifugal force acting on a magnetic fluid in the magnetic-fluid type sealing mechanism shown in FIG. 2.

A first embodiment of the spindle motor in accordance with the present invention will be described with specific reference to FIGS. 1 to 3.

Figure 1:
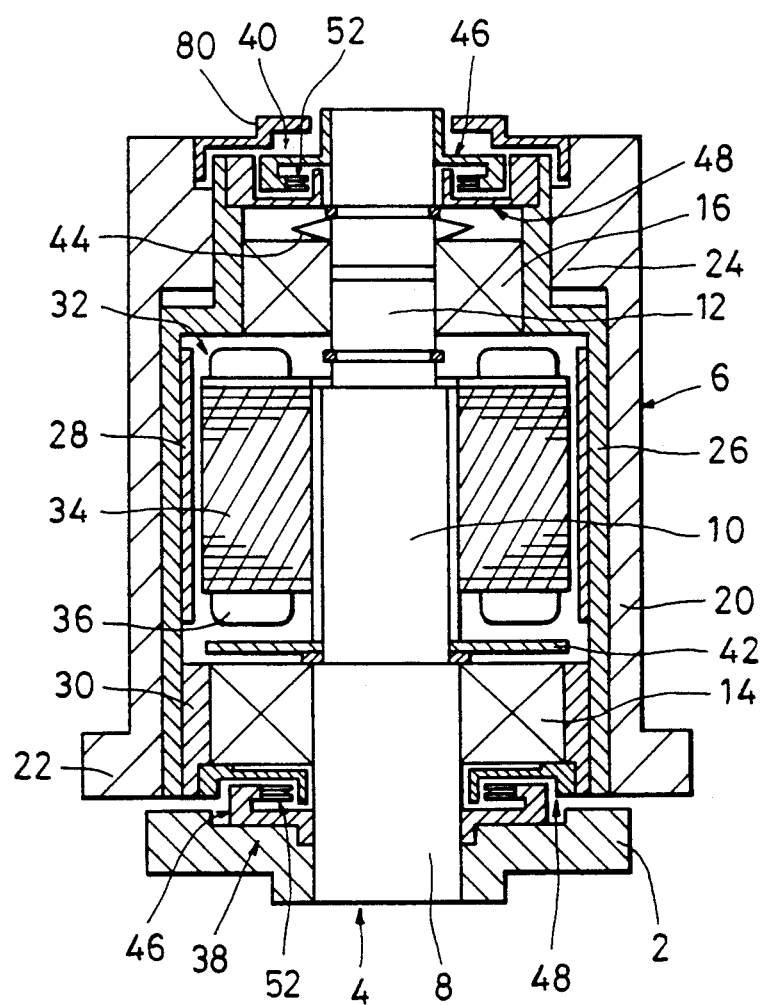
FIG. 1 is a sectional view of an embodiment of the spindle motor in accordance with the present invention.

Referring to FIG. 1, a spindle motor has a bracket 2, a fixed shaft member 4 and a hub member 6. The hub member 6 has a substantially circular form and is attached to a base plate (not shown) of a driving device for rotatingly driving a recording member such as a magnetic disk.

The fixed shaft member 4 has a lower large-diameter portion 8, an intermediate medium-diameter portion 10 and an upper small-diameter portion 12 as viewed in FIG. 1. One end of the fixed shaft member 4, i.e., the large-diameter end 8, is located substantially at the midst of the bracket 2.

The hub member 6 is rotatably mounted on the fixed shaft member 8 through bearing members 14 and 16. The hub member 6 has a cylindrical hub main part 20 which is provided at its one end with radially extending flange 22 and at its other end with an annular wall 24 projecting radially inward. A yoke member 26 made of a magnetic material is provided on the inner peripheral surface of the hub main part 20. The yoke member extends substantially over the entire length of the hub main part 22 from one to the other end thereof. An annular magnet 28 is provided on the inner peripheral surface of the yoke member 26 substantially at the axially mid portion thereof. One bearing member 14 is provided on the large-diameter portion 8 so as to rotatably support one end (lower end as viewed in FIG. 1) of the hub main part 20 through the yoke member 26 and an annular bush member 30, while the other bearing member 16 is disposed on the small-diameter portion 12 of the fixed shaft member 4 so as to rotatably support the other end (upper end as viewed in FIG. 1) of the hub main part 20 through the yoke member 26. A stator 32 is disposed inside the rotor magnet 28 so as to oppose the rotor magnet 28. The stator 32 has a stator core 34 which is mounted on the medium-diameter portion 10 of the fixed shaft member 4, and an armature coil 36 which is wound on the stator core 34 in a predetermined manner. Therefore, the hub member 6 is rotated due to inter-action between the rotor magnet 28 and the stator 32, whereby the recording member (not shown) is rotated in a predetermined direction.

The first embodiment is provided with magnetic-fluid. type sealing mechanisms 38 and 40 which are arranged around the bearing members 14 and 16, respectively. The lower magnetic-fluid type sealing mechanism 38 surrounding the bearing member 14 and the upper magnetic-fluid type sealing mechanism 40 surrounding the bearing 16 have substantially the same construction, so that one of these sealing mechanisms will be described later as representative. A circuit assembly 42 including a hall element (not shown) is interposed between the bearing member 14 and the stator 32. At the same time, a disk spring 44 is loaded between the bearing member 16 and the magnetic-fluid type sealing mechanism 40 so as to pre-load the bearing members 14 and 16.

The magnetic-fluid type sealing mechanism 40 will be described in detail with reference to FIGS. 1 and 2. As explained before, the following description of the construction of this mechanism 40 directly applies also to the construction of the other magnetic-fluid type sealing mechanism 38. Referring to FIGS. 1 and 2, the magnetic-fluid type sealing mechanism 40 (38) has a stationary member 46 attached to the fixed shaft member 8, a rotary member 48 secured to the hub member 6 and a magnetic fluid holding means 52 for holding a magnetic fluid 50. The stationary member 46 has a sleeve-like shaft mounting portion 54, an annular mounting portion 56 extending radially outward from the shaft mounting portion 54, and a connecting portion 58 which interconnects the shaft mounting portion 54 and the annular mounting portion 56. The rotary member 48 has a hub mounting portion 60 opposing the outer peripheral surface of the stationary shaft member 4, an annular portion 62 disposed on the radially inner side of the hub mounting portion 60, and a rotary connecting portion 66 interconnecting the hub mounting portion 60 and the annular portion 62. It is necessary that at least the annular portion 62 of the rotary member 48 is made of a magnetic material, though the whole rotary member 48 may be formed from a magnetic material as in the case of the illustrated embodiment. As shown in FIG. 2, the annular mounting portion 56 of the stationary member 46 extends axially inward within a space inside the hub mounting portion 60 of the rotary member 48, while the annular portion 62 of the rotary member 48 extends axially outward within a space between the fixed shaft member 4 and the annular mounting portion 56. The magnetic fluid holding means 52 is secured to the annular mounting portion 56 of the stationary member 46 and extends radially inward toward the annular portion 62 of the rotary member 48. In the illustrated embodiment, the magnetic fluid holding means 52 is composed of an annular permanent magnet 68 and a pair of pole pieces 70 and 72 which are provided on axially opposite surfaces of the annular permanent magnet 68. The pole pieces 70 and 72 are fixed at their outer peripheral surfaces to the stationary member 46. The pole pieces 70 and 72 slightly project radially inward beyond the inner peripheral end of the permanent magnet 68 and a magnetic fluid 50 is poured into the space between the inner peripheral end of the permanent magnet 68 and the annular portion 62 of the rotary member 48.

In this embodiment, the rotary member 48 is notched at the corner between the hub mounting portion 60 and the rotary connecting portion 66 so as to provide an annular fluid receiving recess 74 which extends substantially over the entire circumference of the rotary member 48. The annular recess 74 has a radially inward opening through which the magnetic fluid flowing along the rotary connecting portion 66 is received in the recess 74. The connecting portion 58 of the stationary member 46 is provided with a plurality of magnetic fluid filling ports 76 arranged at a constant circumferential pitch. In the illustrated embodiment, three filling ports 76 are formed substantially at 120° intervals. The space between the pair of pole pieces 70,72 and the annular portion 62 of the rotary member 48 is filled with the magnetic fluid through these filling ports 76, so that magnetic fluid layers are formed between the inner peripheral ends of the pole pieces 70, 72 and the annular portion 62 of the rotary member 48. After the filling, the filling ports 76 are sealed by seal members 78 which may be formed from polyester, and effectively prevents external scattering of the magnetic fluid which may otherwise occur through these filling ports 76.

The operation of the described spindle motor is as follows. Referring mainly to FIGS. 2 and 3, the hub member 6 rotates in the direction of an arrow 80 (see FIG. 3) as the spindle motor is started. In consequence, a comparatively large centrifugal force $F_1$ acts on a portion of the magnetic fluid 50 contacting the annular portion 62 of the rotary member 48 tending to displace the above-mentioned portion of the magnetic fluid 50 radially outward. Meanwhile, the stationary member 46 and, hence, the pair of pole pieces 70 and 72 are kept stationary, so that no substantial centrifugal force (or negligibly small level of centrifugal force) is applied to the portions of the magnetic fluid 50 contacting the pole pieces 70 and 72. These portions of the magnetic fluid 50, therefore, remain still without being displaced radially outwardly. The portions of the magnetic fluid 50 which are displaced radially outward by the centrifugal force progressively approach the pole pieces 70 and 72. As these portions approach the pole pieces, the velocity of rotation of these portions of the magnetic fluid progressively decreases to cause a drastic reduction in the centrifugal force. The centrifugal force is decreased substantially to zero as the portions of the magnetic fluid 50 reach the ends of the pole pieces 70, 72. Consequently, the magnetic fluid 50 is magnetically held between the annular portion 62 of the rotary member 48 and the pair of pole pieces 70 and 72, rather than flowing along the surfaces of the pair of pole pieces 70 and 72, whereby scattering of the magnetic fluid 50 is prevented without fail.

In the illustrated embodiment, the scattering of the magnetic fluid 50 is effectively prevented by virtue of the basis structural features described hereinbefore. In some cases, however, a small portion of the magnetic fluid 50 may happen to escape from the space between the pole pieces 70, 72 and the annular portion 62 of the rotary member 48. In the illustrated embodiment, however, external scattering of such portion of the magnetic fluid can be effectively avoided for the following reason. Namely, any portion of the magnetic fluid 50 which has escaped to the upper side of the above-mentioned space as viewed in FIG. 2 is conveniently received in the annular fluid receiving space defined by the stationary connecting portion 58 of the stationary member, annular mounting portion 60 of the rotary member 48 and the magnetic fluid holding means 52, so that this portion of the magnetic fluid 50 is never scattered to the outside. Similarly, any portion of the magnetic fluid which has escaped to the lower side as viewed in FIG. 2 is received in the fluid receiving recess 74 which is formed in the corner between the rotary connecting portion 66 and the hub mounting portion 60 of the rotary member 48, so that this portion of the magnetic fluid 50 also is prevented from being scattered externally.

In order to provide a greater effect of preventing the scattering of the magnetic fluid 50, an annular cap member 81 may be provided on the outer side of the magnetic-fluid type sealing mechanism 40 as shown in FIG. 1. Although the magnetic fluid holding means 52 in the illustrated embodiment is composed of the permanent magnet 68 and a pair of pole pieces 70, 72, this is not exclusive and the magnetic fluid holding means 52 can have a variety of constructions. For instance, the magnetic fluid holding means 52 may be composed of a permanent magnet and a single pole piece provided on one end surface of the permanent magnet. It is also possible to substitute a labyrinth sealing mechanism for either one of the two magnetic-fluid type sealing mechanisms 70 and 72.

Second Embodiment

A description will now be given of a second embodiment of the spindle motor of the present invention, with specific reference to FIGS. 4 and 5.

Figure 4:
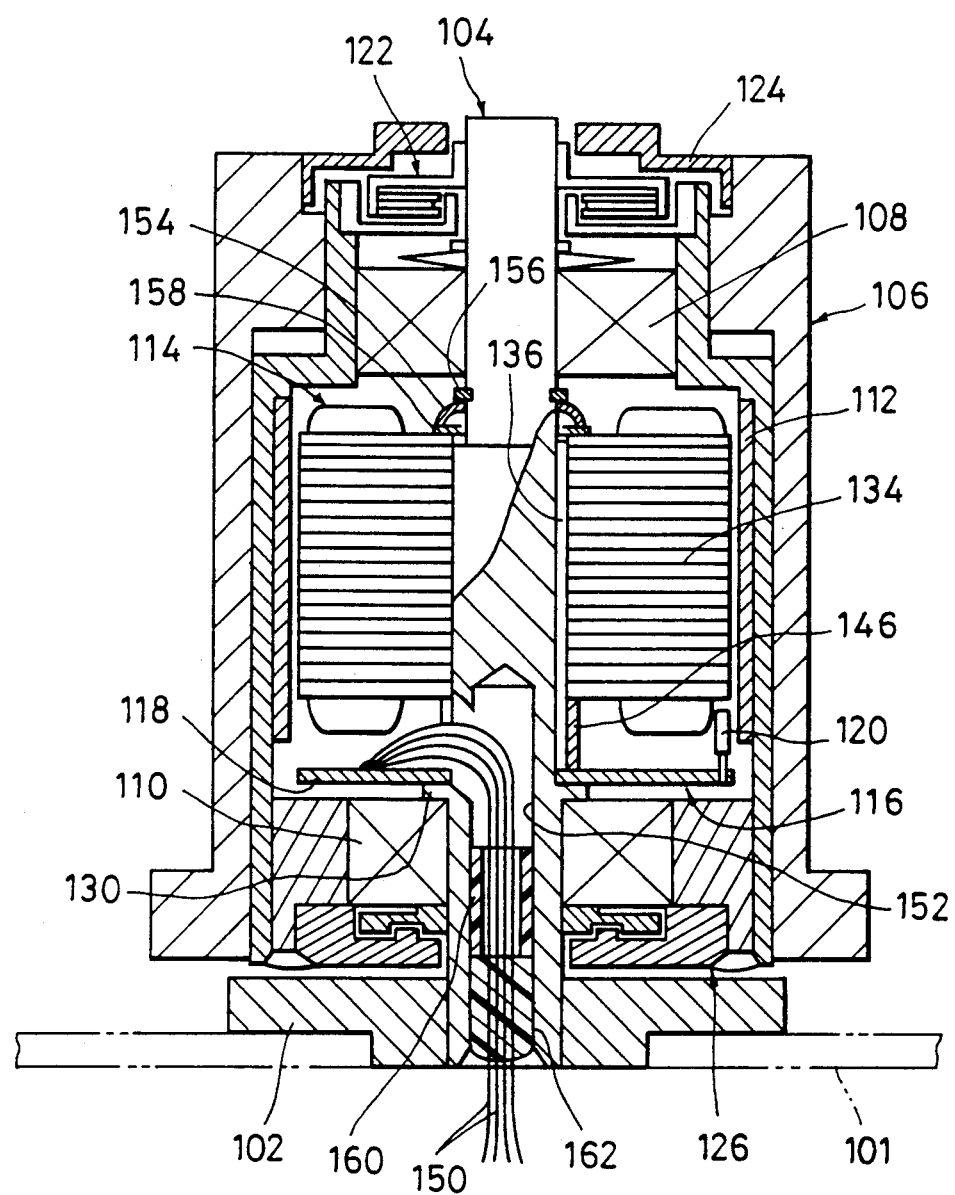
FIG. 4 is a sectional view of a second embodiment of the spindle motor in accordance with the present invention.
Figure 5:
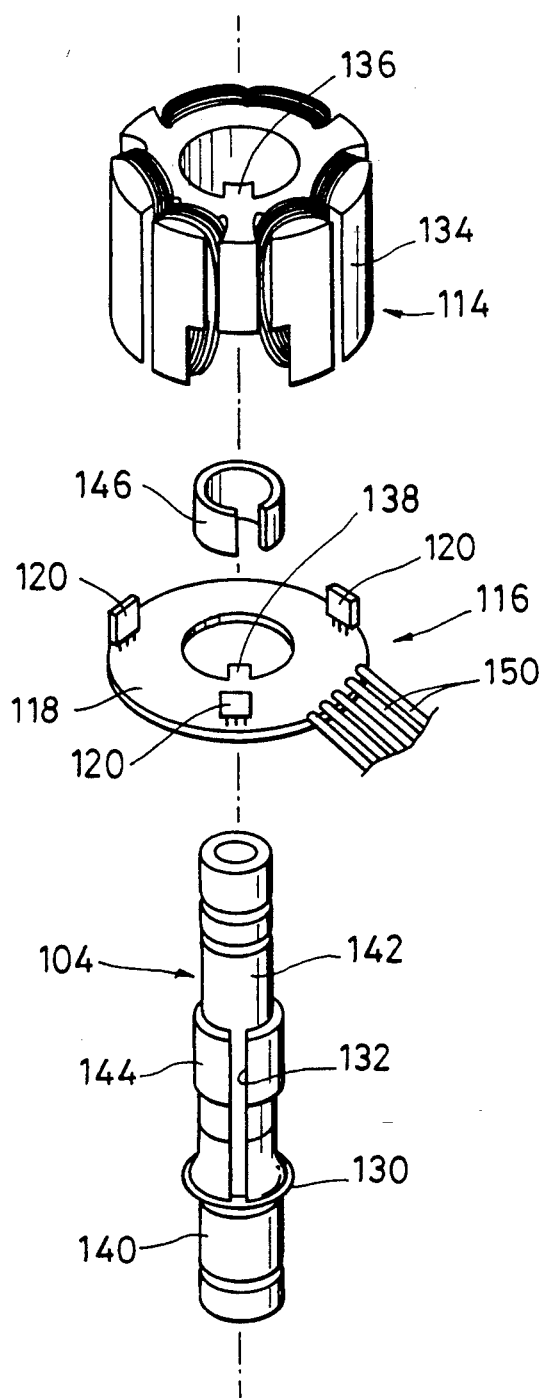
FIG. 5 is an exploded perspective view of the spindle motor of FIG. 4, showing particularly a portion of the spindle motor.

Referring to FIG. 4, the second embodiment also has a bracket 102, a fixed shaft member 104 and a hub member 106. Thus, the basic arrangement of this embodiment is substantially the same as that of the first embodiment. More specifically, the bracket 102 is fixed to a base plate 101 of the driving device, and one end (lower end as viewed in FIG. 4) of the fixed shaft member 104 is fixed to the bracket 102. The hub member 106 is rotatably supported by the fixed shaft portion 104 through bearings 108 and 110. A rotor magnet 112 is mounted on the inner peripheral surface of the hub member 106 through a yoke member 111. A stator 114 is disposed inside the rotor magnet 112 so as to oppose the rotor magnet 112. A circuit assembly 116 is disposed beneath the stator 114 as viewed in FIG. 4. The circuit assembly 116 has a substantially circular circuit board 118 which is provided with an annular position sensing means for sensing the rotational angular position of the rotor magnet 112. The angular position sensing means may be formed from a hall element 120. In the second embodiment, three hall elements 120 are arranged at equal circumferential intervals shown in FIG. 5. The stator 114 and the circuit assembly 116 are disposed in a space defined by the hub member 106, and are mounted on the fixed shaft member 104 in a manner which will be described later. The bearing member 108 is surrounded by a seal mechanism 122 having a construction which is substantially the same as those of the magnetic-fluid type sealing mechanisms used in the first embodiment. A cap member 124 is provided on the outer side of the sealing mechanism 122. The other bearing member 110 is surrounded by a labyrinth sealing mechanism 126 which is known per se.

A detailed description will be given of the manner in which the stator 114 and the circuit assembly 116 are mounted, with specific reference to FIGS. 4 and 5. In the second embodiment, the fixed shaft member 104 is provided with an annular projection or collar 130 which is integrally formed on a lower portion of the fixed shaft member 104 as viewed in FIGS. 4 and 5 and which serves as means for preventing axial movement of the fixed shaft member 104. In order to circumferentially locate the stator 114 and the circuit assembly 116 with respect to the fixed shaft member 104, a locating means is disposed between the fixed shaft member 104 and the stator 114 and the circuit assembly 116. In the illustrated embodiment, the locating means includes a locating recess 132 provided in the fixed shaft member 104, and locating projections 136 and 138 which are formed, respectively, on the stator core 134 of the stator 114 and the circuit board 118 of the circuit assembly 116. Obviously, this arrangement may be modified such that the locating means is composed of locating projections formed on the fixed shaft member 104 and recesses formed in the stator 114 and the circuit assembly 118.

To explain in more detail, the fixed shaft member 104 has a large-diameter portion 140 on one end thereof and a small-diameter portion 142 on the other end thereof and an intermediate medium-diameter portion 144 through which the large and small diameter portions are connected. The above-mentioned annular projection or collar 130 is formed on the portion of the fixed shaft portion 104 between the large-diameter portion 140 and the medium-diameter portion 144, while the locating recess 132 is formed in the surface of the medium-diameter portion 144 so as to extend from one to the other end of this portion 144. The locating projections 136 and 138, each having a rectangular form, are provided on the inner peripheral surface of the circuit board 118 so as to extend radially inward therefrom at a position corresponding to the locating projection 138.

A spacer member 146 is disposed between the stator 114 and the circuit assembly 116. The spacer 146 has a sleeve-like form and is provided with a slit extending from one to the other end thereof. As will be seen from FIG. 4, a plurality of lead lines 150 extend from the circuit assembly 116 are inserted into guide ports 152 formed in the fixed shaft member 104, through the above-mentioned slit formed in the space member 146. Although the illustrated embodiment employs an independent spacer member 146, the spacer member 146 maybe substituted by a plurality of spacing projections formed on the stator 114 and/or the circuit assembly 116. In such a case, the lead lines 150 may be led through the clearances formed between such spacing projections.

In the illustrated embodiment, a disk spring 154 serving as resilient means is provided on the outer side of the stator 114, i.e., on the upper side as viewed in FIG. 4. The disk spring 154 is loaded between the stator 114 and a retainer ring 156 engaging with an annular groove formed in the fixed shaft member 104. Preferably, a plate member 158 is interposed between the disk spring 154 and the stator core 134 as shown in FIG. 4, in order that the resilient force exerted by the disk spring 154 is uniformly applied to the whole area of the stator 114.

The lead lines 150 are led from the circuit assembly 116 through a guide hole 152 formed in the fixed shaft member 104. In order to prevent an adhesive from coming inside the fixed shaft member 104, a sleeve-like blocking member 160 is fitted in the guide hole 152. Thus, the lead lines 150 are led through a hole formed in the blocking member 160. The opening of the guide hole 152 is then charged with the adhesive 162. The adhesive 162 is prevented from flowing into the fixed shaft member 104 even when a long time is required from the adhesive to be cured, because the blocking member 160 effectively blocks any flow of the uncured adhesive which is still in liquid state. In addition, the blocking member 160 stably holds the lead wires at proper positions in the guide hole 152.

The circuit assembly 116 and the stator 114 are mounted on the fixed shaft member 104 in accordance with, for example, the following procedure. After fitting the locating projection 138 with the locating recess 132 in the fixed shaft member 104, the circuit assembly 116 is moved to slide along the shaft member 104 so as to be located at the right position on the medium-diameter portion 144 of the shaft member 104. The spacer 146 is then fitted on the shaft member 104. Subsequently, the stator 114 is positioned in the medium-diameter portion 144 of the shaft member 104 in the same manner as the mounting of the circuit assembly 116, with the locating projection 136 fitted in the locating recess 132. Thus, the locating projections 136, 138 engage with the locating recess 132 so as to prevent rotation of the stator 114 and the circuit assembly 116 relative to the fixed shaft member 104, while ensuring that the circuit assembly, in particular the hall elements 120, are held in a predetermined positional relationship to the stator 114.

Subsequently, the plate member 158 and the disk spring 154 are mounted on the shaft member 104, followed by fitting of the retaining ring 156 in the annular groove formed in the fixed shaft member 104, so that the outer peripheral edge of the disk spring 154 acts on the stator 114 through the plate member 158, whereby the stator 114, the spacer member 146 and the circuit assembly 116 are urged downward as viewed in FIG. 4, i.e., towards the collar 130. Consequently, the circuit assembly 116 is brought into contact with the collar 130 so that the circuit assembly 116, spacer 146 and the stator 114 are resiliently held in positions shown in FIG. 4. Consequently, these members are prevented from moving also in the axial direction. The circuit assembly 116 and the stator 114 are held at a predetermined distance from each other by the spacer member 146, so that the hall elements 120 are held in correct positional relationship to the rotor magnet 112.

Although the invention has been described through its preferred forms, it is to be understood that the described embodiments are not exclusive and various changes and modifications maybe imparted thereto without departing from the scope of the invention which is limited solely by the appended claims.

What is claimed is:

1. A spindle motor comprising a fixed shaft member, a hub member rotatably supported by said fixed shaft member through bearing means, a rotor magnet mounted on said hub member, a stator disposed inside the rotor magnet so as to oppose said rotor magnet, and a magnetic-fluid type sealing mechanism arranged between said fixed shaft member and said hub member, said magnetic-fluid type sealing mechanism having a rotary member mounted on the hub member, a stationary member mounted on said fixed shaft member, and magnetic fluid holding means for holding a magnetic fluid, said rotary member including an axially extending annular portion made of a magnetic material adjacent the outer peripheral surface of said fixed shaft member and having a radially outwardly facing annular surface, a hub mounting portion fixed to said hub member, and a radially extending rotary connecting portion interconnecting said hub mounting portion and said annular portion, said stationary member including an axially extending annular mounting portion arranged in radially outwardly spaced relationship with said annular portion of said rotary member, a shaft mounting portion fixed to said shaft member, and a radially extending stationary connecting member interconnecting said shaft mounting portion and said annular mounting portion, said annular mounting portion of said stationary member being disposed radially between said annular portion and said hub mounting portion of said rotary member, said magnetic fluid holding means being secured to said annular mounting portion of said stationary member, and disposed radially between said mounting portion and said axially extending annular portion of said rotary member and facing radially inwardly in closely spaced opposing relationship with said radially outwardly facing annular surface on said annular portion of said rotary member, and said magnetic fluid holding means and said axially extending annular portion of said rotary member thus cooperating in holding magnetic fluid therebetween.

2. A spindle motor according to claim 1, wherein an annular fluid receiving recess is formed in the corner between said hub mounting portion and said rotary connecting portion of said rotary member substantially over the entire circumference of said rotary member so as to receive said magnetic fluid flowing along said rotary connecting portion.

3. A spindle motor according to claim 1, wherein a plurality of magnetic fluid filling ports are formed in said stationary connecting portion of said stationary member at a predetermined circumferential interval.

4. A spindle motor according to claim 3, wherein each of said magnetic fluid filling ports is sealed with a sealing member after the filling.

5. A spindle motor comprising a fixed shaft member, a hub member rotatably supported by said fixed shaft member through bearing means, a rotor magnet mounted on said hub member, a stator mounted on said fixed shaft member so as to oppose said rotor magnet, and a circuit assembly mounted on said fixed shaft member and including an angular position sensor for sensing the rotational angular position of said rotor magnet, wherein said fixed shaft member has an axially extending locating means, and said stator and said circuit assembly each have locating means cooperating in common with said locating means of said fixed shaft member so as to set said stator and said circuit assembly in a predetermined angular positional relationship to each other.

6. A spindle motor according to claim 5, wherein said fixed shaft member is provided with a radially projecting stopper projection, said stator and said circuit assembly being mounted on said fixed shaft member such that said locating means on said fixed shaft member engages in common with said locating means of said stator and said circuit assembly, said spindle motor further comprising urging means for urging said stator and said circuit assembly toward said stopper projection, said stator and said circuit assembly being held at predetermined axial positions on said fixed shaft member by cooperating between said stopper projection and said urging means.

7. A spindle motor according to claim 6, wherein a spacer member is placed between said stator and said circuit assembly so as to keep a predetermined axial space therebetween.

8. A spindle motor according to claim 7, wherein said spacer member is provided with a slit through which lead lines leading from said circuit assembly are led to a guide hole formed in said fixed shaft member.

9. A spindle motor comprising a fixed shaft member, a hub member rotatably supported by said fixed shaft member through bearing means, a rotor magnet mounted on said hub member, a stator mounted on said fixed shaft member so as to oppose said rotor magnet, and a circuit assembly including an angular position sensor for sensing the rotational angular position of said rotor magnet, wherein said fixed shaft member is provided with a radially projecting stopper projection, said stator and said circuit assembly being mounted on said fixed shaft member in a manner not rotatable relative to said fixed shaft member, said spindle motor further comprising urging means for urging said stator and said circuit assembly towards said stopper projection, said stator and said circuit assembly being held at predetermined axial positions on said fixed shaft member by cooperation between said stopper projection and said urging means.

10. A spindle motor according to claim 9, wherein said urging means is composed of a disk spring.

11. A spindle motor according to claim 9, wherein said circuit assembly and said stator are mounted on said fixed shaft member in the mentioned order of mounting sequence, and a plate member is interposed between said stator and said urging means.

12. A spindle motor comprising a fixed shaft member, a hub member rotatably supported by said fixed shaft member through bearing means, a rotor magnet mounted on said hub member, a stator mounted on said fixed shaft member so as to oppose said rotor magnet, and a circuit assembly including an angular position sensor for sensing the rotational angular position of said rotor magnet, said circuit assembly being received in a space defined by said hub member with lead lines leading from said circuit assembly to exterior through a guide hole formed in said fixed shaft member, wherein a blocking member is mounted in said guide hole and an adhesive is charged in the open end portion of said guide hole outside said blocking member so as to seal said guide hole.

13. A spindle motor according to claim 12, wherein said blocking member is a ring-shaped member having a slit extending in the outer peripheral surface of said ring-shaped member from one to the other axial ends thereof.

* * * * *